(12) United States Patent
Lin et al.

(10) Patent No.: US 7,734,131 B2
(45) Date of Patent: Jun. 8, 2010

(54) FABRY-PEROT TUNABLE FILTER USING A BONDED PAIR OF TRANSPARENT SUBSTRATES

(75) Inventors: Pinyen Lin, Rochester, NY (US); Peter M. Gulvin, Webster, NY (US); Yao Rong Wang, Webster, NY (US); Lalit K Mestha, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 680 days.

(21) Appl. No.: 11/405,774

(22) Filed: Apr. 18, 2006

(65) Prior Publication Data

US 2007/0242920 A1    Oct. 18, 2007

(51) Int. Cl.
*G02B 6/42* (2006.01)
(52) U.S. Cl. ....................................................... 385/27
(58) Field of Classification Search .................... 385/27
See application file for complete search history.

(56) References Cited

U.S. PATENT DOCUMENTS

| | | | | |
|---|---|---|---|---|
| 6,128,122 | A * | 10/2000 | Drake et al. | 359/224.1 |
| 6,295,130 | B1 | 9/2001 | Sun et al. | |
| 6,980,346 | B1 | 12/2005 | Greer et al. | |
| 7,130,103 | B2 * | 10/2006 | Murata | 359/290 |
| 7,316,899 | B2 * | 1/2008 | McDevitt et al. | 435/6 |
| 7,369,294 | B2 * | 5/2008 | Gally et al. | 359/260 |
| 2005/0226553 | A1 | 10/2005 | Hugon et al. | |
| 2007/0090483 | A1 * | 4/2007 | Tapalian et al. | 257/499 |

OTHER PUBLICATIONS

Mott et al., "Micromachined Tunable Fabry-Perot Filters for Infrared Astronomy," Proceedings—SPIE The International Society for Otpical Engineering, 1999.*
Mott et al., "Micromachined Tunable Fabry-Perot Filters for Infrared Astronomy," Proceedings—SPIE The International Society for Otpical Engineering, 1999.*
Mott et al., "Micromachined Tunable Fabry-Perot Filters for Infrared Astronomy," *Proceedings—SPIE The International Society for Optical Engineering*, 1999.
Dohi et al., "The Optical Blood Test Device with the Micro Fabry-Perot Interferometer," *17th IEEE Internaitonal Conference on MEMS*, 2004.
Friese et al., "Polymer-based membrane mirrors for micro-optical sensors," IEEE, pp. 667-672, 2003.

(Continued)

*Primary Examiner*—Uyen-Chau N Le
*Assistant Examiner*—Hoang Tran
(74) *Attorney, Agent, or Firm*—Fay Sharpe LLP (57) ABSTRACT

A tunable Fabry-Perot filter (8, 118, 218, 318, 418) includes substrates (10, 12) with parallel generally planar facing principal surfaces (14, 16) including spaced apart facing reflective surface regions (20, 22) that are at least partially reflective over a wavelength range and define an optical gap ($G_{opt}$) therebetween. At least one substrate of the pair of substrates is light transmissive over the selected wavelength range to enable optical coupling with the optical gap. Electrodes (24, 26) are disposed on the facing principal surfaces of the substrates. The electrodes on the facing principal surfaces of the substrates are define an electrode gap therebetween such that electrical biasing of the electrodes simultaneously modifies the optical and electrode gaps.

22 Claims, 9 Drawing Sheets

OTHER PUBLICATIONS

Correia et al., "MEMS: a New Joker in Microinstrumentation," IEEE Industrial Electronics Society Newsletter 1/00, 3 pp., 2000.

Correia et al., High-Selectivity Single-Chip Spectrometer in Silicon for Operation at Visible Part of the Spectrum, IEE Transactions on Electron Devices, vol. 47, No. 3, pp. 553-559, 2000.

U.S. Appl. No. 11/092,635, filed Mar. 30, 2005, Mestha, et al.

U.S. Appl. No. 11/319,395, filed Dec. 29, 2005, Mestha, et al.
U.S. Appl. No. 11/319,389, filed Dec. 29, 2005, Wang, et al.
U.S. Appl. No. 11/319,276, filed Dec. 29, 2005, Lin, et al.
U.S. Appl. No. 11/016,952, filed Dec. 20, 2004, Mestha, et al.
U.S. Appl. No. 11/092,835, filed Mar. 30, 2005, Wang, et al.
U.S. Appl. No. 11/833,231, filed Apr. 27, 2007, Mestha, et al.
U.S. Appl. No. 10/758,096, filed Jan. 16, 2004, Mestha, et al.

\* cited by examiner

FABRY-PEROT TUNABLE FILTER USING A BONDED PAIR OF TRANSPARENT SUBSTRATES

CROSS REFERENCE TO RELATED PATENTS AND APPLICATIONS

Cross-reference is made to the following co-pending, commonly assigned applications, which are incorporated in their entireties, by reference:

U.S. application Ser. No. 11/406,030, filed Apr. 18, 2006, entitled "FABRY-PEROT TUNABLE FILTER," by Lin et al.;

U.S. application Ser. No., 11/405,941, filed Apr. 18, 2006, entitled "PROJECTOR BASED ON TUNABLE INDIVIDUALLY-ADDRESSABLE FABRY-PEROT FILTERS," by Gulvin, et al.;

U.S. application Ser. No. 11/092,635, filed Mar. 30, 2005, entitled "TWO-DIMENSIONAL SPECTRAL CAMERAS AND METHODS FOR CAPTURING SPECTRAL INFORMATION USING TWO-DIMENSIONAL SPECTRAL CAMERAS," by Mestha et al.;

U.S. application Ser. No. 11/319,395, filed Dec. 29, 2005, entitled "SYSTEMS AND METHODS OF DEVICE INDEPENDENT DISPLAY USING TUNABLE INDIVIDUALLY-ADDRESSABLE FABRY-PEROT MEMBRANES," by Mestha et al.;

U.S. application Ser. No. 11/319,389, filed Dec. 29, 2005, entitled "RECONFIGURABLE MEMS FABRY-PEROT TUNABLE MATRIX FILTER SYSTEMS AND METHODS," by Wang, et al.;

U.S. application Ser. No. 11/016,952 filed Dec. 20, 2004, entitled "FULL WIDTH ARRAY MECHANICALLY TUNABLE SPECTROPHOTOMETER," by Mestha, et al;

U.S. application Ser. No. 11/092,835, filed Mar. 30, 2005, entitled "DISTRIBUTED BRAGG REFLECTOR SYSTEMS AND METHODS," by Wang, et al.; and U.S. application Ser No. 10/833,231, filed Apr. 27, 2004, entitled "FULL WIDTH ARRAY SCANNING SPECTROPHOTOMETER," by Mestha, et al.

BACKGROUND

The following relates to the optical arts. It is described with particular reference to example illustrated embodiments relating to optical Fabry-Perot filters configured for operation in the visible or near infra-red wavelength range, and with reference to example illustrated embodiments relating to imaging sensors employing same. However, the following finds more general application in Fabry-Perot filters operating in wavelength ranges other than the visible and near infra-red, and in manufacturing methods for making Fabry-Perot filters, and in diverse applications employing Fabry-Perot filters, such as digital photography, electrophotographic printing, tunable color filters, wireless communications, and so forth.

Tunable Fabry-Perot filters provide operative capabilities including high Q filtering, precision wavelength tuning, and the ability to perform rapid spectral sweeps. Tunable Fabry-Perot filters configured for operation in the visible and/or near infra-red wavelength range have applications in imaging, fiber optical communication systems, and so forth. However, fabrication of Fabry-Perot filters for these wavelength ranges is difficult. The optical wavelength range is about 400-700 nm; accordingly, a tunable Fabry-Perot filter usable for color measurements or filtering typically has a tunable gap of about 300 nm with a tunable precision of about 10 nm. Low voltage operation is also desirable for certain applications, such as portable battery-powered devices.

Micro-electromechanical systems (MEMS) devices have been used to fabricate tunable Fabry-Perot filters for use in the visible or near infra-red range. However, difficulties have been encountered, including warping-induced filtering errors, fragility of the thin optical membranes sometimes used in such devices, manufacturing processes that are time consuming, labor-intensive, and/or costly, undesirably high operating voltages for achieving the tuning, and so forth.

INCORPORATION BY REFERENCE

The following references, the disclosures of which are incorporated by reference in their entireties, are mentioned:

U.S. Pat. No. 6,295,130 to Sun, et al., issued Sep. 25, 2001, discloses a Fabry-Perot cavity spectrophotometer.

U.S. Published Application No. 20050226553, published Oct. 13, 2005, entitled "OPTICAL FILTRATION DEVICE," by Hugon, et al., discloses wavelength selective optical components for transmitting light in a narrow spectral band, which is centered on a wavelength, and for reflecting the wavelengths lying outside this band. The component includes an input guide conducting light radiation to a tunable filter and means for returning a first part of the radiation reflected by the filter during the first pass in order to perform a second pass through it.

BRIEF DESCRIPTION

Aspects of the exemplary embodiment relate to a Fabry-Perot filter, a method of forming a filter, and a CCD imaging sensor employing the filter.

In one aspect, a tunable Fabry-Perot filter includes a pair of substrates having parallel generally planar facing principal surfaces including spaced apart facing reflective surface regions that are at least partially reflective at least over a selected wavelength range. The spaced apart facing reflective surface regions define an optical gap therebetween. At least one substrate of the pair of substrates is light transmissive at least over the selected wavelength range to enable optical coupling with the optical gap through the at least one substrate. Electrodes are disposed on the parallel generally planar facing principal surfaces of the substrates. The electrodes on the parallel generally planar facing principal surfaces define an electrode gap therebetween such that electrical biasing of the electrodes simultaneously modifies the optical and electrode gaps In another aspect, a light detector includes a tunable Fabry-Perot filter including: a pair of light-transmissive substrates having parallel generally planar facing principal surfaces including spaced apart facing reflective surface regions that are at least partially reflective at least over a selected wavelength range, the spaced apart facing reflective surface regions defining an optical gap therebetween; and electrodes disposed on the parallel generally planar facing principal surfaces of the substrates, the electrodes on the facing principal surfaces defining an electrode gap therebetween such that electrical biasing of the electrodes simultaneously modifies the optical and electrode gaps. A photodetector array is optically coupled with the facing reflective surface regions of the Fabry-Perot filter.

In another aspect, a method of forming a tunable Fabry-Perot filter includes, for each of a pair of substrates, forming on a generally planar principal surface of the substrate a reflective surface region that is at least partially reflective at least over a selected wavelength range. The reflective surface region is surrounded by a peripheral region of the substrate. For at least one substrate of the pair of substrates, portions of the substrate are removed by lithographically controlled wet chemical etching to define a deformable connection region between the reflective surface region and the peripheral region. The peripheral regions of the pair of substrates are secured in fixed relationship to one another with the reflective surface regions of the pair of substrates facing each other and spaced apart after the securing.

BRIEF DESCRIPTION OF THE DRAWINGS

Unless otherwise indicated, the drawings are not to scale.

FIG. 2 diagrammatically shows a plan-view of one transparent substrate of the device of FIG. 1 including the deformable connection but omitting the electrical and optical features. In FIG. 2, section S-S indicates the section line for FIG. 1.

FIG. 3 diagrammatically shows a plan-view of one transparent substrate of the device of FIG. 1, after formation of the spring-arm and the electrical and optical features. In FIG. 3, section S-S indicates the section line for FIG. 1.

DETAILED DESCRIPTION

Figure 1:
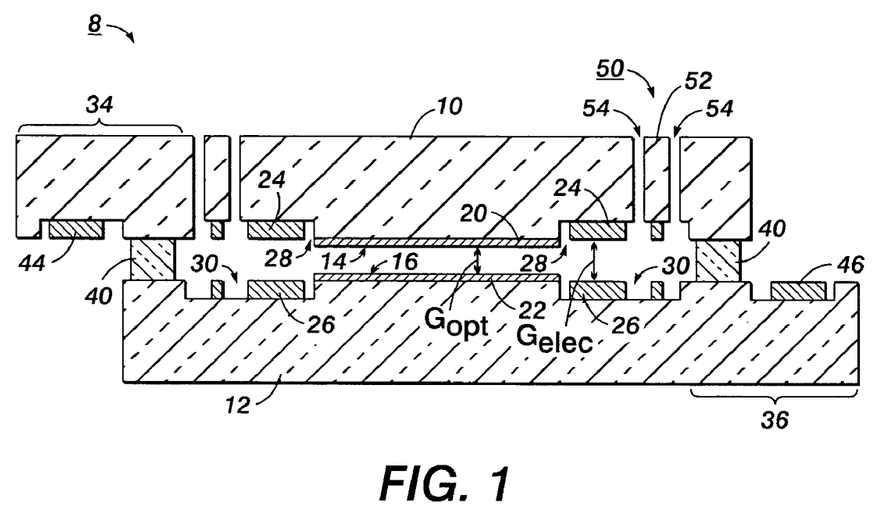
FIG. 1 diagrammatically shows a cross-sectional view of a tunable Fabry-Perot device.
Figure 2:
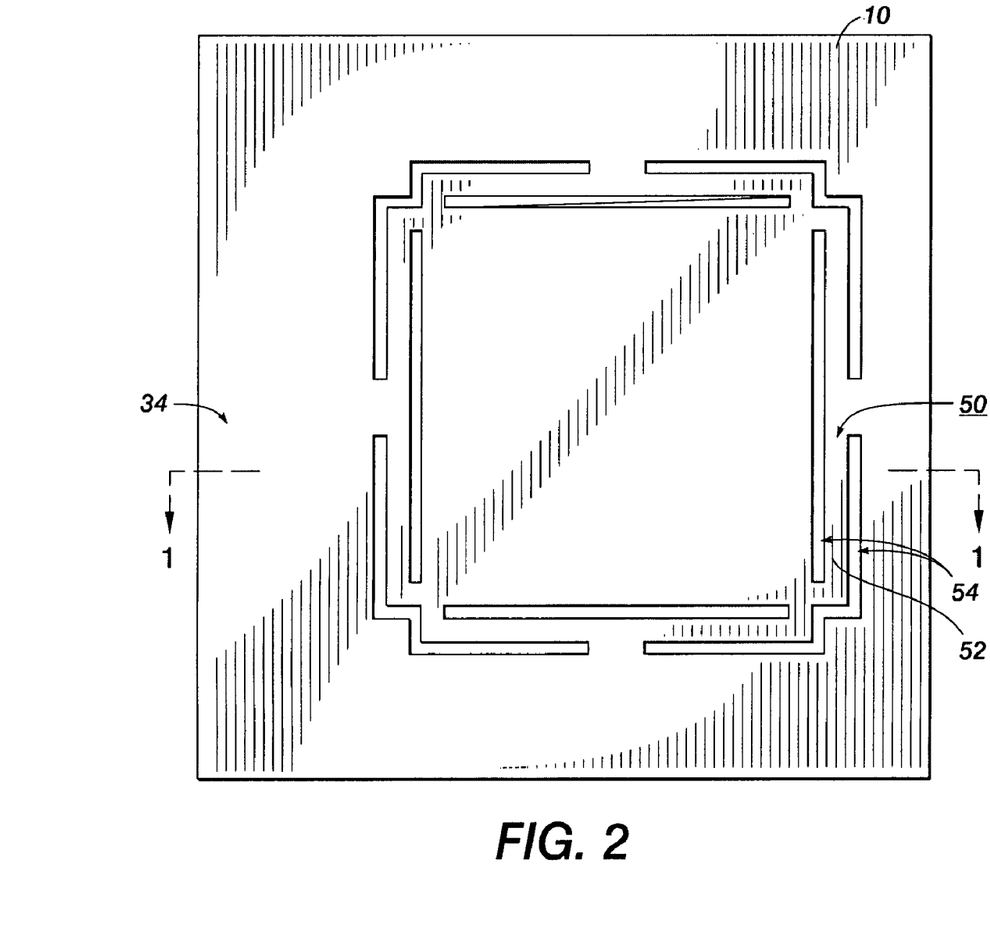
Figure 3:
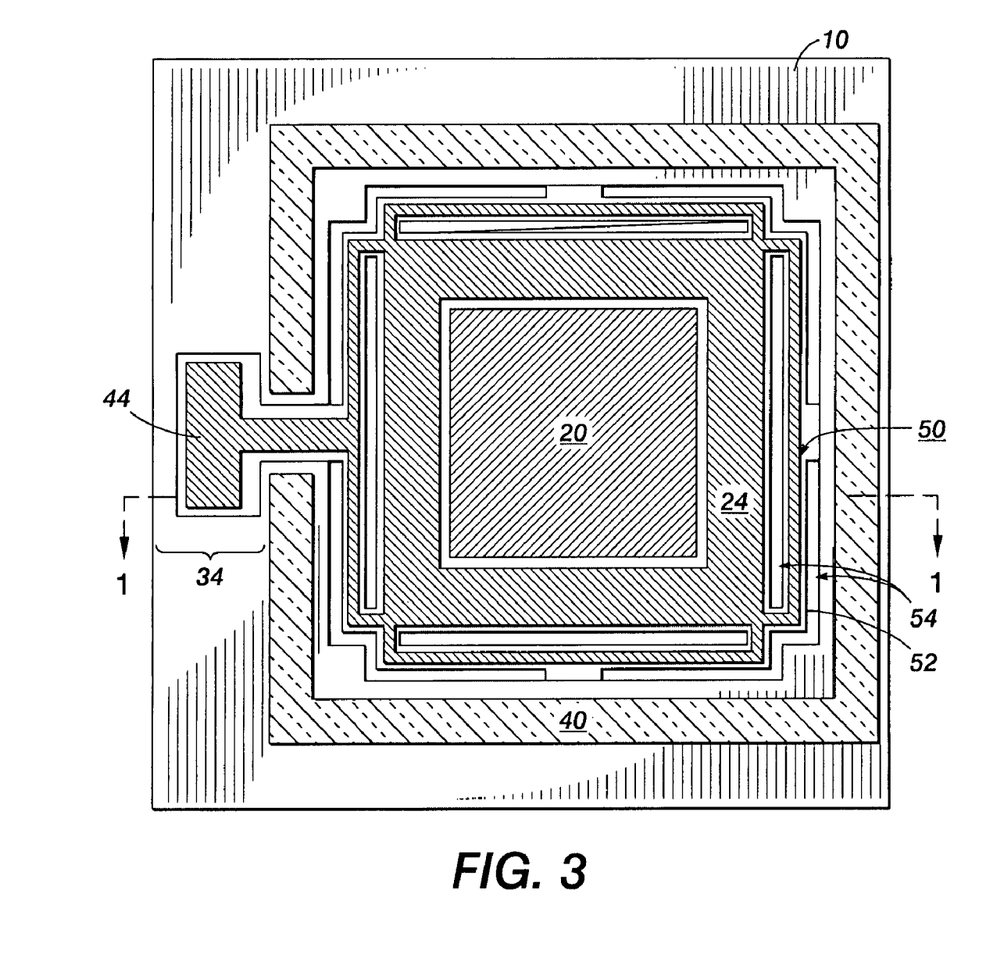

With reference to FIGS. 1-3, a tunable Fabry-Perot filter 8 is described. The Fabry-Perot filter 8 is a tunable optical interference filter or device. The terms "Fabry-Perot filter", "Fabry-Perot device", "optical interference filter", and "optical interference device" are used interchangeably herein. The Fabry-Perot filter 8 includes a pair of substrates 10, 12 having generally planar spaced-apart facing principal surfaces 14, 16 that include facing reflective surface regions 20, 22 that are typically thin metallic films or distributed Bragg reflectors having layer thicknesses and periodicity selected to make the reflectors at least partially reflective at least over a selected wavelength range. For operation in reflection mode, at least one of the substrates should be light-transmissive at least over the selected wavelength range. For operation in transmission mode, both substrates should be light-transmissive at least over the selected wavelength range. The illustrated embodiments are designed to operate in a light transmission mode. The facing reflective surface regions 20, 22 define an optical gap $G_{opt}$ therebetween. The optical gap is adjustable so as to tune the resonant wavelength of the Fabry-Perot filter 8.

In some suitable embodiments, the substrates 10, 12 are silica substrates, which are light transmissive over substantially the whole visible and near infra-red wavelength range, and the reflective surface regions 20, 22 are dielectric Bragg reflectors formed by layers of dielectric material of alternating refractive index. The generally planar spaced-apart facing principal surfaces 14, 16 should have small short-range surface variations and roughness. Typical commercially available silica wafers may be insufficiently smooth in the as-supplied state, and should be smoothed, for example by using mechanical polishing stages with increasingly fine grit, so as to obtain the facing principal surfaces 14, 16 with sufficient flatness. While the illustrated substrates 10, 12 are square substrates (as seen in FIGS. 2 and 3), the shape of the substrates can be circular, rectangular, or so forth.

Recessed electrodes 24, 26 are formed in recesses 28, 30 of the generally planar spaced-apart facing principal surfaces 14, 16, respectively. As a result of the recesses 28, 30, an electrode gap $G_{elec}$ between the electrodes 24, 26 of the generally planar spaced-apart facing principal surfaces 14,16 is larger than the optical gap $G_{opt}$ between the facing reflective surface regions 20, 22.

The substrates 10, 12 include peripheral regions 34, 36 surrounding at least the facing reflective surface regions 20, 22. The peripheral regions 34, 36 of the pair of substrates 10, 12 are arranged in fixed position to one another, for example by adhering, clamping, or otherwise securing the peripheral regions 34, 36 together. To design the optical gap $G_{opt}$ appropriately so as to provide a Fabry-Perot resonant cavity having a tunable range at least spanning the selected wavelength range, a suitably sized spacer or spacers 40 are disposed between the peripheral regions 34, 36 of the pair of substrates 10, 12. The spacer or spacers 40 may be, for example, a metal or insulating film of suitable thickness selectively disposed on one or both of the peripheral regions 34, 36. Electrical bonding pads 44, 46 are disposed on the peripheral regions 34, 36, respectively. The electrical bonding pads 44, 46 electrically communicate with electrodes 24, 26, respectively, by printed or deposited electrically conductive pathways or the like. In the Fabry-Perot filter 8 of FIGS. 1-3, the bonding pads 44, 46 are disposed on the same side as the electrodes 24, 26, and are similarly recessed. This arrangement is typically conducive to convenient manufacturing; however, the recessing of the bonding pads 44, 46 may be omitted, and indeed the bonding pads may be located at substantially any externally accessible location of the Fabry-Perot filter 8 that provides a stable point for applying an electrical bias.

In the Fabry-Perot filter 8 of FIGS. 1-3, a deformable connection 50 is disposed between the peripheral region 34 and the reflective surface region 20. In the example Fabry-Perot filter 8, the deformable connection 50 is disposed between the peripheral region 34 and the portion of the substrate 10 supporting the reflective surface region 20 and the electrode 24. The deformable connection 50 includes a spring arm 52 defined by slots 54 formed in the substrate 10. (FIG. 2 shows a plan-view of the deformable connection 50 and the reflective surface region 20 while omitting the electrode 24 and spacer 40).

The resonant condition for a Fabry-Perot filter with light incident through substrate 10 is $2 \times G_{opt} \times \cos(\theta) = m\lambda_{res}$, where $\lambda_{res}$ is the resonant wavelength, $\theta$ is the angle of incidence of the light respective to the normal to the generally planar spaced-apart facing principal surfaces 14, 16, and m is an integer. Light at the resonance wavelength passes through the Fabry-Perot filter 8 substantially unattenuated or attenuated by a small attenuation factor; however, for light at wavelengths away from resonance, the Fabry-Perot filter 8 is substantially optically opaque. For normal incidence ($\theta=0°$, $\cos(\theta)=1$) and m=1 operation, $G_{opt}$ should be one-half of the desired resonant (i.e., transmitted) wavelength. The Fabry-Perot filter 8 acts as a narrow-bandpass filter. The precise value of the unbiased optical gap $G_{opt}$ is a design parameter selected to enable tuning over at least over a selected wavelength range.

In operation, a selected electrical bias is applied to the electrodes 24, 26 via bonding pads 44, 46 to tune the optical gap $G_{opt}$ and hence vary the resonance wavelength $\lambda_{res}$. By biasing the electrodes 24, 26, the principal surface 14 of the substrate 10, on which are disposed the reflective surface region 20 and the electrode 24, is electrostatically attracted toward the spaced-apart facing principal surface 16 of the substrate 12. This movement of the principal surface 14 respective to the facing principal surface 16 simultaneously modifies the optical gap $G_{opt}$ and the electrode gap $G_{elec}$.

In FIG. 1, the electrodes 24, 26 are recessed while the surface regions 20, 22 are not recessed. Alternatively, it is contemplated to additionally recess the substrates in the areas of the reflective surface regions 20, 22 by an etch-back process so as to achieve the desired optical gap. In that case, if the electrodes 24, 26 and spring 52 are also recessed, it would be possible to eliminate the spacer or spacers 40 and have the optical gap be determined by the amount of recessing of the reflective surface regions. This would enable greater flexibility in bonding the substrates 10, 12, since the wafers would then be in direct contact.

The electrodes 24, 26 operate substantially similarly to facing capacitive plates. Because the electrostatic attraction between such capacitive plates increases more rapidly with decreasing spacing than the spring force, a phenomenon known as "pull-in instability" can arise if the capacitive plate spacing becomes too small. In some embodiments, the reduced optical gap appropriate for tuning to shorter visible wavelengths would be sufficiently small that electrodes spaced at that distance would be pulled together due to the pull-in instability. For some applications, by arranging $G_{elec}$ to be sufficiently larger than $G_{opt}$ using the recesses 28, 30, the Fabry-Perot filter 8 is tunable to short wavelength corresponding to a small tuned optical gap, while keeping the electrodes separation large enough to prevent pull-in instability. For some other applications, the electrodes can be kept from shorting by another method, such as by covering the electrodes with insulating materials or having insulated protrusions—in such embodiments, the electrodes are optionally not recessed, or optionally may be recessed. In the Fabry-Perot filter 8, both electrodes 24, 26 are recessed in respective spaced-apart facing principal surfaces 14, 16; however, in other embodiments, the electrodes on only one of the two spaced-apart facing principal surfaces may be recessed, or none of the electrodes could be recessed.

Figure 4:
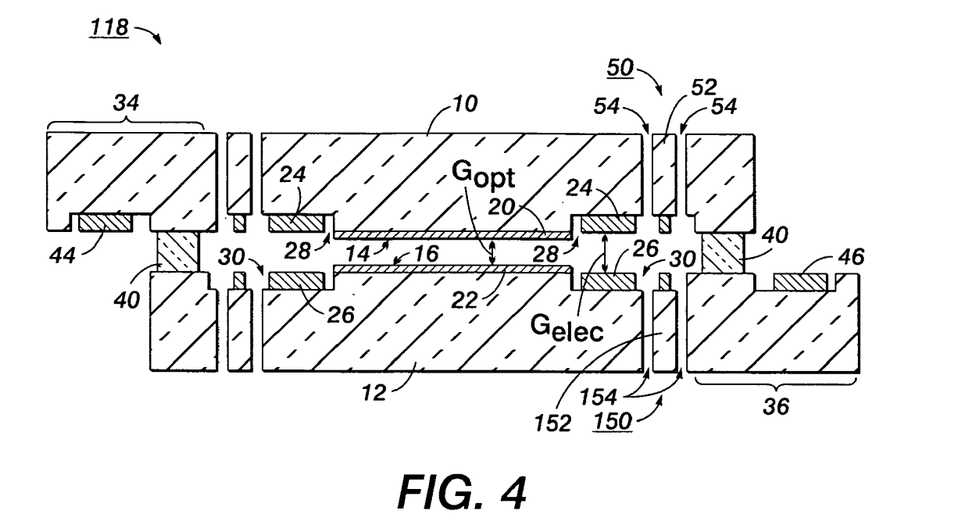
FIG. 4 diagrammatically shows a cross-sectional view of another tunable Fabry-Perot device.

With reference to FIG. 4, a Fabry-Perot filter 118 is a modified version of the Fabry-Perot filter 8, which is modified in that the substrate 12 also includes a deformable connection 150, disposed between the peripheral region 36 and the portion of the substrate 12 supporting the reflective surface region 22 and the electrode 26. The deformable connection 150 has the same configuration as the deformable connection 50, and includes a spring arm 152 defined by slots 154 in the substrate 12. In the Fabry-Perot filter 118, both spaced-apart facing principal surfaces 14, 16 move responsive to changes in the electrode bias to effectuate changes in the optical and electrode gaps $G_{opt}$ and $G_{elec}$.

Figure 5:
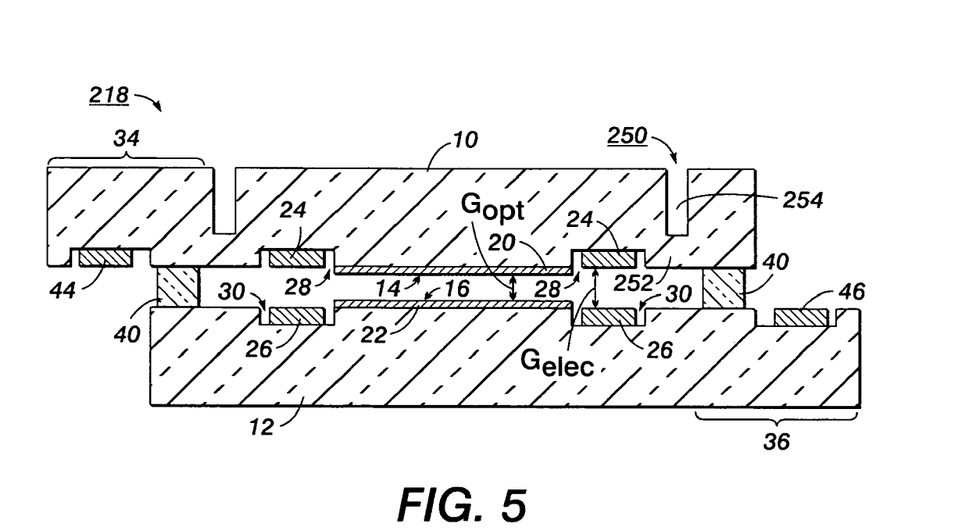
FIG. 5 diagrammatically shows a cross-sectional view of another tunable Fabry-Perot device.

With reference to FIG. 5, a Fabry-Perot filter 218 is a modified version of the Fabry-Perot filter 8, which is modified in that a deformable connection 250 is formed differently from the deformable connection 50. Slots 254 are not formed all the way through the substrate 10, but rather are formed only partway through to leave deformable substrate portions 252. It is also contemplated for the slots 254 to be created from the other side of the substrate 10, so that the thinned region is on the opposite side of the substrate 10 from what is shown in FIG. 5. The thinned substrate regions 252 of thinned silica or other substrate material typically bend more readily than the thicker surrounding silica or other substrate material, so that the deformable substrate portions 252 act as a spring. To create a more flexible spring, a wider hole can be created, or the remaining thickness can be reduced. The tuning mechanics are relatively sensitive to the depth of etch, that is, to the thickness of the thinned substrate portions 252, since the stiffness of the thinned portions 252 is typically proportional to the thickness cubed.

Figure 6:
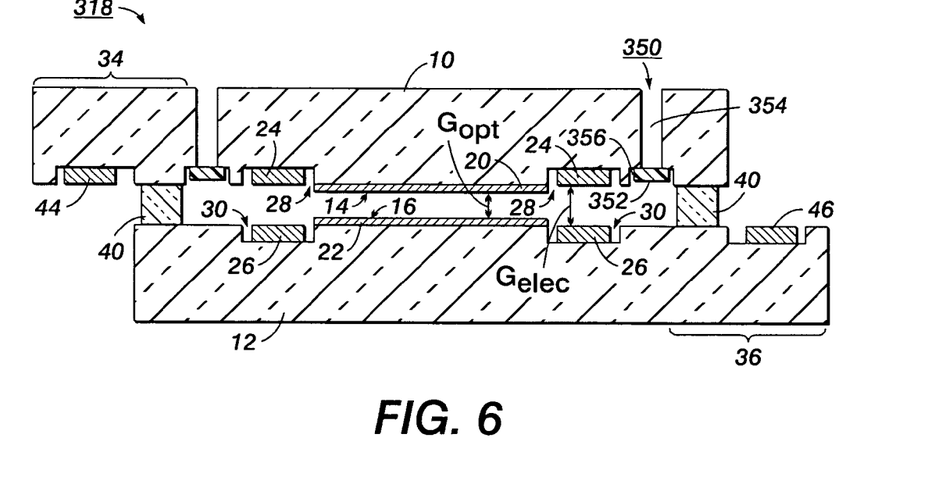
FIG. 6 diagrammatically shows a cross-sectional view of another tunable Fabry-Perot device.

With reference to FIG. 6, a Fabry-Perot filter 318 is a modified version of the Fabry-Perot filter 8, which is modified in that a deformable connection 350 is formed differently from the deformable connection 50. Slots 354 are formed all the way through the substrate 10 in the filter 318, and are covered by a deformable material 352. It is also contemplated to have the deformable material 352 disposed on the other side of the substrate 10. The deformable material 352 is typically made of a material other than the material of the substrate 10. Moreover, in some embodiments the slots 354 are formed by a material-selective wet chemical etching process that etches the substrate material but not the deformable material 352. In such embodiments, the deformable material 352 is optionally applied to the substrate 10, typically using lithographic processing to limit it to selected areas of the substrate 10. The wet chemical etching follows, so that the deformable material 352 acts as an etch stop. In the illustrated embodiment, the deformable material 352 is deposited in a recess 356 formed into the generally planar principal surface 14, so that the deformable material 352 does not contact the facing generally planar principal surface 16 to act as an unintentional spacer. In contemplated embodiments in which the deformable material 352 is on the other side of the substrate 10, the deformable material is optionally not recessed, since in these arrangements the deformable material is located outside of the gap and does not have the potential to act as an unintentional spacer.

In some suitable embodiments of the Fabry-Perot filter 318, the substrate 10 is a silica substrate, and the deformable material 352 is a polysilicon material. The recess 356 is etched in the silica generally planar principal surface 14, and the polysilicon material 352 is deposited inside the recess 356 so that the top surface of the polysilicon material 352 is lower than or about flush with the top edge of the recess 356. This ensures that the polysilicon 352 does not interfere with device motion during filter tuning, or act as an inadvertent spacer. The polysilicon 352 is then patterned, for example lithographically, to create a planar region of polysilicon 352. The silica substrate 10 is then etched through until the polysilicon 352 is reached, which acts as an etch stop. The edges of the etched slots 354 should be inside the edges of the polysilicon 352 to avoid completely removing the anchor points of the polysilicon 352.

Figure 7:
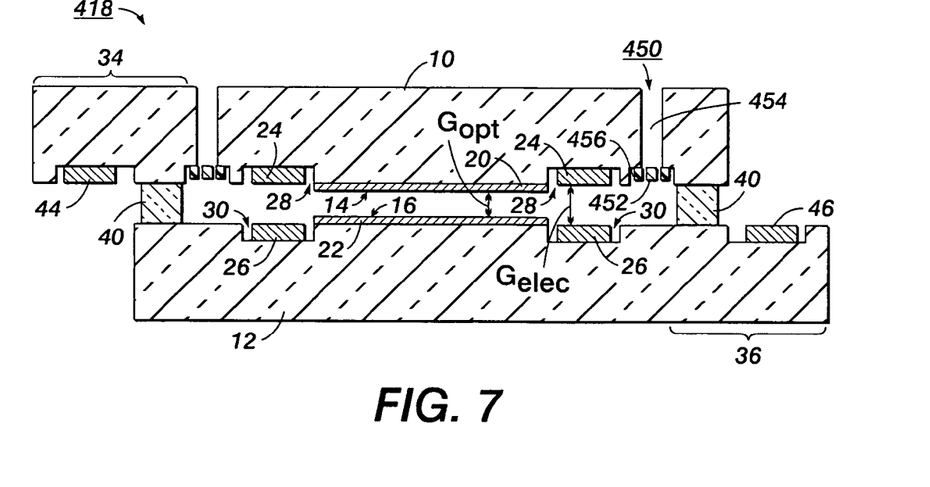
FIG. 7 diagrammatically shows a cross-sectional view of another tunable Fabry-Perot device.

With reference to FIG. 7, a Fabry-Perot filter 418 is a modified version of the Fabry-Perot filter 318 of FIG. 6, which is modified in that a deformable connection 450 has a different configuration from the deformable connection 350. The planar deformable material 352 of the filter 318 is replaced by a deformable material 452 that is formed or patterned, by lithography or another technique, to define a folded spring such as an arrangement of zig-zagging beams. Such a folded spring arrangement provides more flexibility in less space. The deformable material 452 is disposed in recesses 456 over slots 454 that are similar to the recesses 356 and slots 354 of the filter 318.

An advantage of the Fabry-Perot filters 318, 418 that employ polysilicon deformable material 352, 452 is that the polysilicon layer can be formed with precise thickness by various deposition techniques, providing good run-to-run reproducibility.

In the illustrated embodiments, biasing electrodes are provided on the spaced-apart facing principal surfaces 14,16 to effectuate tuning of the Fabry-Perot filter. By recessing the electrodes, a tunable dynamic range of the optical gap $G_{opt}$ sufficient to span a selected visible or near infrared wavelength range of interest can be obtained while keeping the electrode gap $G_{elec}$ sufficiently large to prevent pull-in instability even for the smallest tuned optical gaps. Because the biasing electrodes are on the spaced-apart facing principal surfaces 14, 16, rather than (for example) on the backsides of the substrates 10, 12, the electrode gap $G_{elec}$ is kept small (but large enough to avoid pull-in instability). The electrostatic force between two parallel-plate capacitors is inversely proportional to the square of the distance—accordingly, the design of the Fabry-Perot filters 8, 118, 218, 318, 418 having the small electrode gap $G_{elec}$ advantageously typically provides tuning with a substantial dynamic range at low applied biasing voltages. In some embodiments, bias voltages of 5-10 volts are sufficient to scan the Fabry-Perot filter across the visible wavelength range. At these low voltages, battery-based operation is practical.

Electrode biasing is used in the illustrated embodiments to effectuate tuning of the optical gap $G_{opt}$. In other contemplated embodiments, other driving mechanisms are contemplated to adjust the optical gap, such as magnetically-based drivers, piezoelectric transducers, or so forth.

Figure 8:
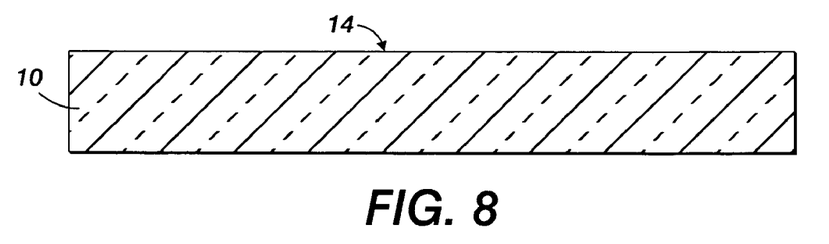
FIGS. 8-12 diagrammatically show cross-sectional views of portions of one of the transparent substrates of the Fabry-Perot device of FIG. 1 at various progressive manufacturing stages.

With reference to FIGS. 8-14, some suitable approaches for manufacturing the Fabry-Perot filter 8 of FIG. 1 are described. Processing is described respective to the substrate 10; however, processing of the substrate 12 is substantially similar, except for omission of formation of the slots 54 that define the deformable connection 50. In addition, there could other processing differences if only one of the electrodes 24, 26 is recessed. FIG. 8 shows the starting substrate 10, which may for example be a silica substrate such as a glass or quartz wafer or slide. The principal surface 14 is polished using mechanical polishing, such as grit-based polishing, optionally combined with a chemical etchant or other chemical polishing component. (If the substrate is obtained commercially with a sufficiently smooth surface, then the polishing is optionally omitted).

Figure 9:
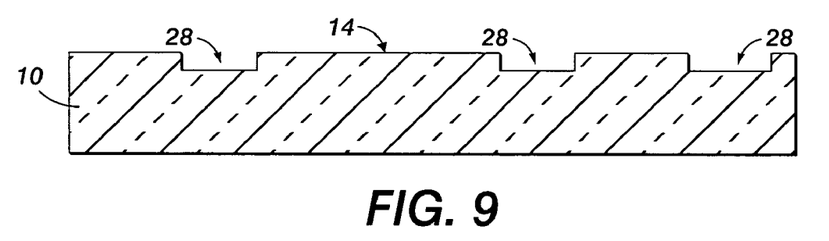

FIG. 9 shows the polished substrate 10 after the electrode recesses 28 are cut into the principal surface 14, for example by shallow etching, to make the electrostatic actuation gap $G_{elec}$ larger than the optical gap $G_{opt}$. The recesses 28 should be deep enough, taking into account the thicknesses of the subsequently formed electrodes 24, 26, so that during filter tuning a run-away pull-in instability is prevented. When the electrostatic gap closes, the electrostatic attraction increases as $1/G_{elec}^2$, while the restoring spring force only increases linearly, so eventually the electrostatic attraction wins out, causing the electrodes to snap together. The recesses 28, 30 keep the electrode gap $G_{elec}$ large enough to avoid this condition. As one example, in order to sweep a visible wavelength range of about 0.4-0.8 micron, the optical gap should go from about 0.2-0.4 micron (recalling that for normal incidence and m=1, $G_{opt}=\lambda_{res}/2$). If the electrostatic gap were the same as the optical gap and the starting gap was at 0.4 micron (that is, the unbiased gap is 0.4 micron, and the tuning is achieved entirely by an attractive mode in which the biasing reduces the gap), then the device would typically be controllable down to about two-thirds of the unbiased gap, or ⅔×0.4 micron=0.27 micron, corresponding to $\lambda_{res}$=0.54 micron, which is inadequate to span the desired 0.4-0.8 micron wavelength range. The electrode recesses 28, 30 make the electrostatic gap $G_{elec}$ larger, so that it is possible to span the optical gap $G_{opt}$ over the desired 0.2-0.4 micron range without reducing the electrode gap $G_{elec}$ below the estimated 0.27 micron threshold for onset of pull-in instability. For example, if the recesses 28, 30 are 1 micron deep and the electrodes 24, 26 are metal or other conductive films having a thickness of 0.5 micron, then the resulting electrode gap $G_{elec}$ will be 1.5 micron (for an unbiased optical gap $G_{opt}$ of 0.5 microns, plus 1 micron on each side due to the 1 micron recesses 28, 30, minus 0.5 micron on each side due to the electrode metal layer thickness). The range of motion will thus be ⅓×1.5=0.5 um (remaining gap of ⅔), more than required. Recessing the electrodes 24, 26 does call for a higher applied tuning voltage due to the larger $G_{elec}$, but this small increase in thickness is readily offset, or at least mitigated, by increasing flexibility of the deformable connection 50. Moreover, the quantitative example recess depths given herein are examples—the skilled artisan can readily design appropriate recess depths by manufacturing and testing a few test devices with different recess depths so as to determine a recess depth for a particular Fabry-Perot device design that is sufficient to prevent pull-in instability in the short wavelength operation range. Additionally, the two recesses 28, 30 can have different depths. The total depth (that is, the sum of the depths of the recesses 28, 30) controls the pull-in instability suppression. For example, in the example above, recessing one side by 2 microns and not recessing the other side at all would have substantially the same result and may simplify the process.

Figure 10:
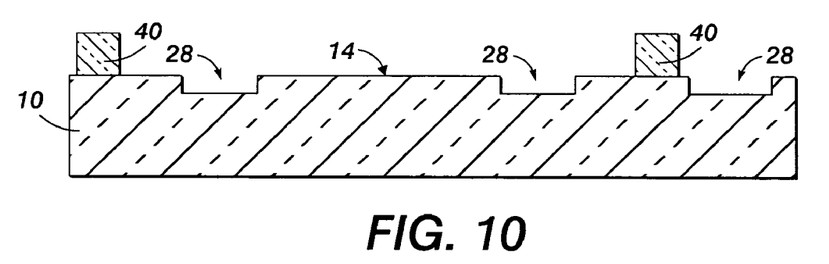

FIG. 10 shows the substrate 10 after formation of the spacers 40. A spacer film is suitably deposited and patterned on the substrate to define the spacer or spacers 40. The spacer or spacers 40 can be made of conducting films like aluminum or gold, or insulating films like silicon dioxide or silicon nitride. The spacer thickness will typically be less than 1 micron, and is selected to define the unbiased optical gap $G_{opt}$.

Figure 11:
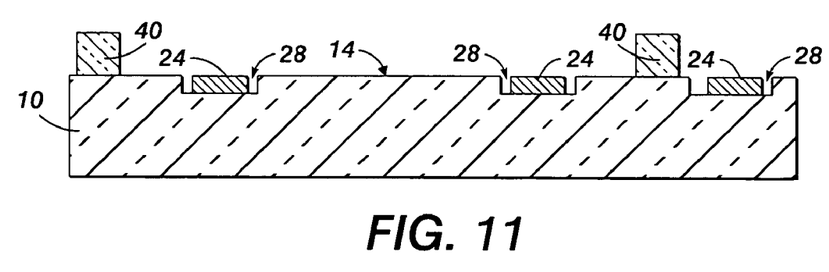

FIG. 11 shows the substrate 10 after formation of the electrode 24, which in some embodiments is suitably formed by lithographically controlled deposition or patterning of a metal layer. The bonding pad 44 and connecting conductive paths are optionally deposited at the same time as the electrode deposition. In some embodiments, the deposited metal is a Cr/Au structure with about 0.03 micron chromium followed by 0.5 micron gold. Aluminum or other metals, or other conductive materials can also be used. For integration with CMOS, it may be advantageous to avoid gold so as to avoid potential contamination of the CMOS circuitry with gold.

In some embodiments, it is contemplated to combine formation of the spacer 40 and formation of the electrode 24 into a combined processing operation. This is suitably accomplished by depositing the metal both in the electrode recess 28 and in selected unrecessed areas of the peripheral region 34 of the substrate 10. The deposition on the unrecessed areas defines spacers that are equal to the metal thickness. If the process is repeated on the other substrate 12 such that the metal-coated unrecessed areas of the two substrates 10, 12 align, then a spacer of twice the metal thickness is generated. This approach typically saves one mask, one deposition step, one lithography step, and one etch or lift-off step.

Bonding pads 44, 46 can be on two different substrates as shown in FIGS. 1 and 4-7. Bonding pads 44, 46 can also be on the same substrate, which is suitably accomplished by making the spacer 40 conductive to electrically interconnect the substrates 10, 12, or alternatively by having other dedicated interconnect contacting pads (not shown) to electrically interconnect the substrates 10, 12. For example, the spacer 40 can contact bonding pad 44; it is then possible to provide power from one substrate, which is communicated to the other substrate via the spacer 40 or other conductive interconnecting pad. In some embodiments, other contacting pads are formed of a solder material that makes the contact resistance low enough between two substrates. It may be more economical to have bonding pads on the same substrate.

In some embodiments, device operation is entirely in the attractive mode in which the bias produces an attractive force between the electrodes 24, 26, and the thickness of the spacer 40 is selected to set the unbiased optical gap $G_{opt}$ to be slightly larger than the largest required optical gap $G_{opt}$. In this way, processing variations can be compensated by applying a calibrated correction to the voltage. A suitable calibration voltage can be determined by inputting light at the longest wavelength of the tuning range, and applying an increasing bias until light transmission through the Fabry-Perot filter is maximized. Thereafter, the bias voltage for transmitting at a particular wavelength is given by the nominal bias voltage plus the offset calibration voltage.

Figures 12, 13:
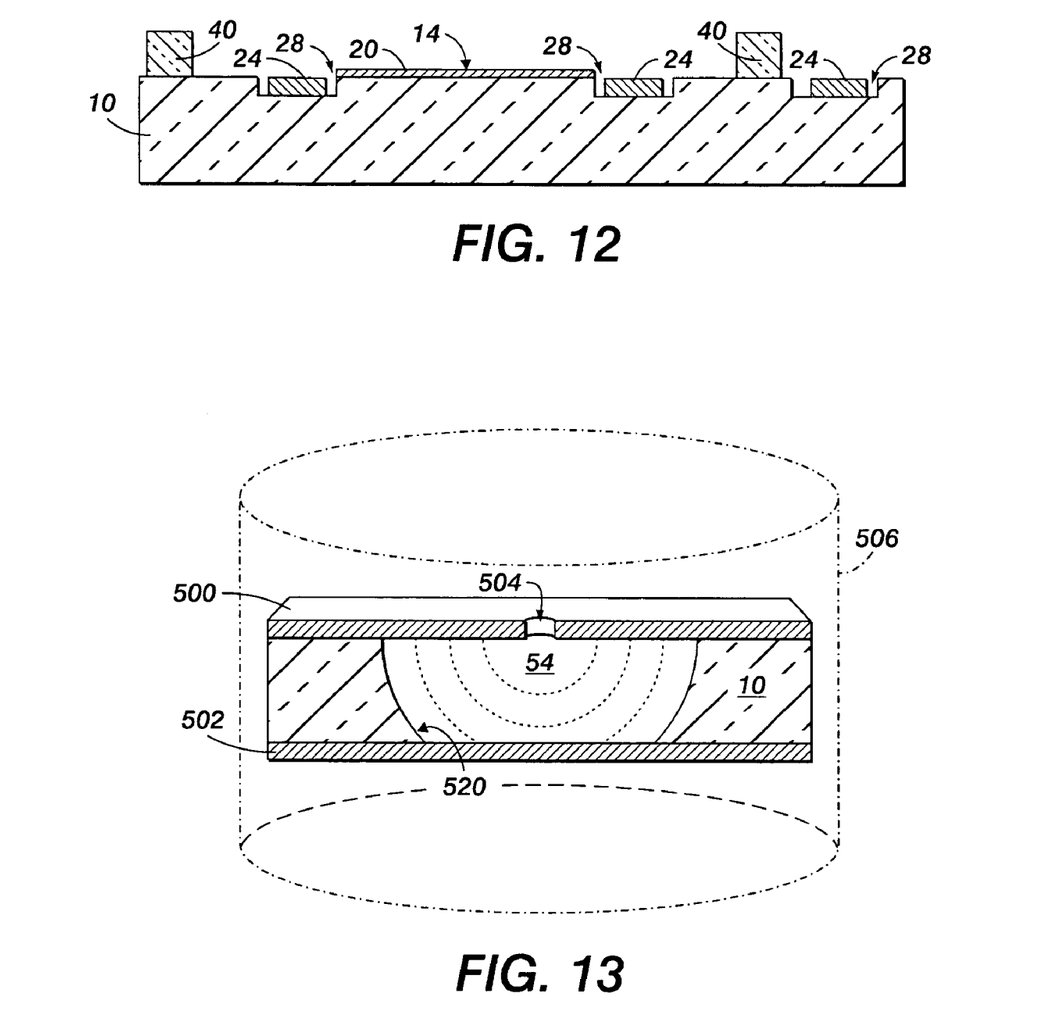
FIG. 13 diagrammatically shows the etch contours for hydrofluoric acid based etching of a silica substrate, where etching is performed starting from only one principal surface of the silica substrate.

FIG. 12 shows the substrate 10 after formation of the reflective surface region 20. After forming the electrode 24, a thin metal layer or distributed Bragg reflector is suitably deposited to enhance the reflectivity of the reflective surface region 20. For typical metals, a metal thickness of about 5 nanometers to 40 nanometers is sufficient to achieve substantially improved reflectivity, while remaining thin enough to permit partial light transmission so as to enable optical coupling into the optical gap $G_{opt}$. Suitable metals include gold, silver, or so forth. Alternatively, the reflective surface region 20 can include a distributed Bragg reflector made of alternating dielectric layers of different refractive indices. Some suitable distributed Bragg reflectors are described, for example, in U.S. application Ser. No. 11/092,835 filed Mar. 30, 2005, entitled "DISTRIBUTED BRAGG REFLECTOR SYSTEMS AND METHODS," by Wang, et al., which is incorporated herein by reference in its entirety. If the Fabry-Perot filter is to be operated in a reflection mode, then the non-light-transmissive substrate can have a thicker, optically opaque reflector such as a thick metal layer.

The processing described with reference to FIGS. 8-12 is an example. Other processing approaches can be used. Moreover, the order of processing operations can be varied—for example, the spacers 40 might be formed before the recesses 28. Although the processing of FIGS. 8-12 was described with reference to the substrate 10, substantially similar or identical processing is suitably performed on the substrate 12. The substrates 10, 12 differ in that the substrate 10 includes the deformable connection 50, whereas the substrate 12 does not. In the case of the Fabry-Perot filter 118 of FIG. 5, the processing of substrates 10, 12 is optionally identical, since in the filter 1118 both substrates 10, 12 have the deformable connection 50, 150, in which case the resulting processed substrates are interchangeable.

The deformable connection 50 of the Fabry-Perot filter 8 is created by forming the slots 54 in the substrate 10. The slots 54 can be formed using substantially any etching technique, such as deep reactive ion etching (DRIE). An advantage of DRIE is that it is highly anisotropic, producing sharp sidewalls. However, since DRIE is performed in a vacuum environment and exhibits a slow etch rate for silica, manufacturing throughput is limited. The configuration of some DRIE etching systems limits processing to a single wafer at a time, with a silica etch rate of 0.4-0.6 microns per minute. Such a DRIE system takes about 10 hours to etch through a 300 um silica wafer, which can lead to a bottleneck in the manufacturing process for making the Fabry-Perot filter 8.

Figure 14:
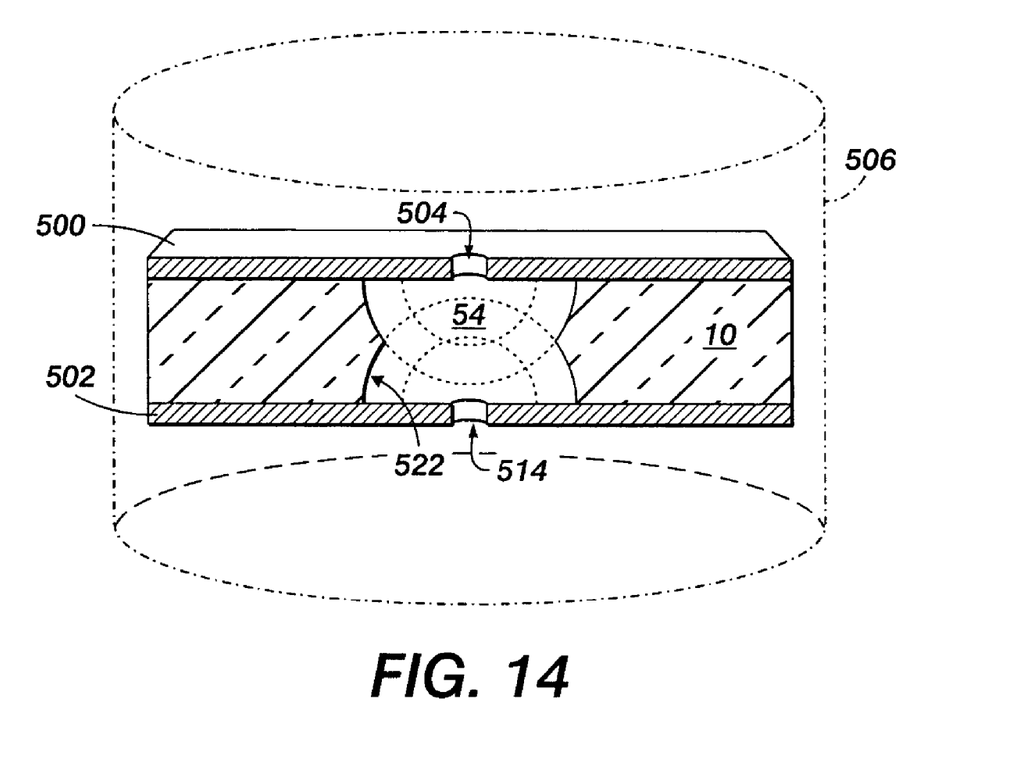
FIG. 14 diagrammatically shows the etch contours for hydrofluoric acid based etching of a silica substrate, where etching is performed starting from both principal surfaces of the silica substrate.

With reference to FIGS. 13 and 14, in another approach the slots 54 are formed by lithographically controlled wet chemical etching. In a suitable embodiment, the substrate is silica and the wet chemical etchant is a hydrofluoric acid (HF) based etchant such as hydrofluoric acid or hydrofluoric acid diluted in deionized water. HF based etchants rapidly etch glass. Masking layers 500, 502, such as polysilicon layers, photoresist layers, or the like, are deposited over the principal surfaces of the substrate 10. Openings 504 corresponding to the slots 54 are patterned into the masking layer 500, and the substrate 10 is immersed or otherwise exposed to an HF based etchant 506 (diagrammatically indicated in FIGS. 13 and 14 by a beaker drawn in phantom) to etch starting at the openings 504 to create the slits 54. The HF based etchant 506 may be pure HF, or HF diluted in water, or HF combined with some other chemical or chemicals. Moreover, wet chemical etchants other than HF based etchants can be used. The wet chemical etchant is selected to provide rapid etching of the material of the substrate 10, and the material of the masking layers 500, 502 is selected at least in part for its resistance to etching by the wet chemical etchant. In FIG. 13, the masking layer 502 is continuous to wholly prevent etching at the surface covered by the masking layer 502. In an alternative process shown in FIG. 14, the mask 502 also includes openings 514, that are aligned with the openings 504 of the mask 500, so that the HF based solution 506 etches starting from both sides of the substrate 10. After etching the wafer in the HF based solution 506, the masking layer is removed using a dry plasma etch, a wet chemical etch, or so forth.

Advantageously, the wet chemical etching of FIG. 13 or FIG. 14 can be performed on a batch of substrates simultaneously. For 300-micron thick silica wafer substrates, a 24-wafer lot can typically be etched in about 1-2 hours, assuming the HF-based etchant has an etch rate for silica of about 5-10 microns/minute. Given the large amount of silica being removed and the exothermic nature of HF etching of silica, care should be taken to ensure that the bath stays cool, for example by flowing the HF based etchant across the substrate 10, by immersing in a cooler bath, or so forth. In the process of FIG. 13, the mask 502 is optionally omitted, and the wafer instead held in a protective holder.

The processing to form the partial slots 254 of the Fabry-Perot filter 218 of FIG. 5 is the same as that shown in FIG. 13, except that the etching is terminated before the slot is formed all the way through the substrate 10, so as to leave the deformable substrate portions 252. The processing to form the slots 354, 454 of the Fabry-Perot filters 318, 418 of FIGS. 6 and 7 is the same as that shown in FIG. 13, except that the polysilicon layer 352, 452 is formed prior to etching and serves as an etch stop for the HF based etching process.

As shown diagrammatically in FIGS. 13 and 14, wet chemical etching of silica by an HF-based etchant is substantially isotropic. Accordingly, the formed slots 54 or thinned regions (for example, the partial slots 254) have rounded surfaces 520, 522 characteristic of formation by wet chemical etching. Larger undercutting is typically observed when etching from one side only (as in FIG. 13) as compared with etching from both sides (as in FIG. 14). It is also contemplated to employ an anisotropic wet chemical etchant, for example in the case of a crystalline substrate having advantageously oriented preferential etch directions for a selected wet chemical etchant. Using an anisotropic wet chemical etchant advantageously may be able to reduce undercutting and increase the etch rate.

Since wet etching is typically less precise than DRIE etching, the minimum feature size will typically be larger using wet chemical etching. For purely isotropic wet chemical etching from a single side (FIG. 13), the undercutting is on the order of the wafer thickness, and the rounded surfaces 520 are hemispherical in shape. For purely isotropic wet chemical etching from both sides (FIG. 14), the undercutting is on the order of one-half of the wafer thickness, and the rounded surfaces 522 are hourglass-shaped. In some typical processes applied to silica substrates, the DRIE etching provides features as small as 2 micron and spring arms of 50 micron widths, whereas with HF based etching reliable spring arms are fabricated with widths of order hundreds of microns. However, for large aperture Fabry-Perot filters having an active area (defined by the area of the facing reflective surface regions 20, 22) that is a few millimeters wide or more, having a larger deformable connection 50 due to large-sized slots 54 does not add significantly to manufacturing cost.

When using relatively imprecise wet chemical etching, the flexing provided by the deformable connection 50 should be relatively insensitive to the precise shape and width of the spring arm 52, since its walls are contoured in accordance with the rounded surfaces 520, 522. Improved manufacturability using wet chemical etching can be achieved by, for example, using a design for the deformable connection 50 that has wide spring arms 52, and/or by performing initial wavelength-bias voltage calibrations on the finished Fabry-Perot filter 8 to correct for run-to-run manufacturing variations.

It is also contemplated to use a substantially isotropic dry etch Instead of wet etching. For example, vapor phase hydrofluoric acid etching can be used for silica substrates, while Xenon Difluoride is suitable for etching silicon substrates. Various types of reactive ion etching are also suitable. Typically, the etching considerations set forth herein respective to wet etching apply to isotropic dry etching as well, except that some dry etching techniques are difficult to apply to multiple wafers simultaneously. In the cases where the wafers are etched individually, typical machines suitable for isotropic dry etching are less expensive than machines used for DRIE, so substantial cost benefits may be obtained over DRIE.

Once the fabrication processing on the substrates 10, 12 (examples of which have been described with reference to FIGS. 8-14) is complete, the peripheral regions 34, 36 of the respective substrates 10, 12 are bonded together to form the configuration shown in FIG. 1. Depending on the material used for the spacer or spacers 40, bonding can be done by anodic bonding, direct silicon bonding, using adhesives, or so forth. Optionally, another material may be deposited on the other substrate opposite the spacer to facilitate the bonding. In another approach, the spacer formation is delayed until the end of processing, and is created using a photoresist or other material that sets or otherwise acts as a glue or adhesive to secure the peripheral regions 34, 36 together.

Another way to ensure the gap distance, $G_{opt}$, at the desired range is to deposit soft, compressible adhesive for bonding and hard, incompressible materials as spacer. The soft, compressible materials at the contact areas would ensure strong adhesion between two substrates, while the hard, incompressible spacer keeps the distance at the desired range. Some examples of suitable soft, compressible materials include solder, polymeric adhesives, and some metals. Some examples of suitable hard, incompressible materials include inorganic thin films, silicon dioxide, silicon nitride, polysilicon, and some metals. The height of the soft, compressive material should be slightly higher than the height of the hard, incompressible material, to be sure that the plates can come close enough for the soft material to touch both wafers to provide bonding. In terms of lateral spacing, the two materials can be adjacent or far apart from each other.

Advantageously, the portion of the substrate that moves during tuning of the Fabry-Perot filter 8 is not thinned, and does not consist of a thin membrane, but rather has the full thickness of the substrates 10, 12 (for example, 300 micron thickness of a typical silica wafer). Accordingly, the facing reflective surface regions 20, 22 have rigid support, allowing for the creation of a uniform optical gap $G_{opt}$.

Figure 15:
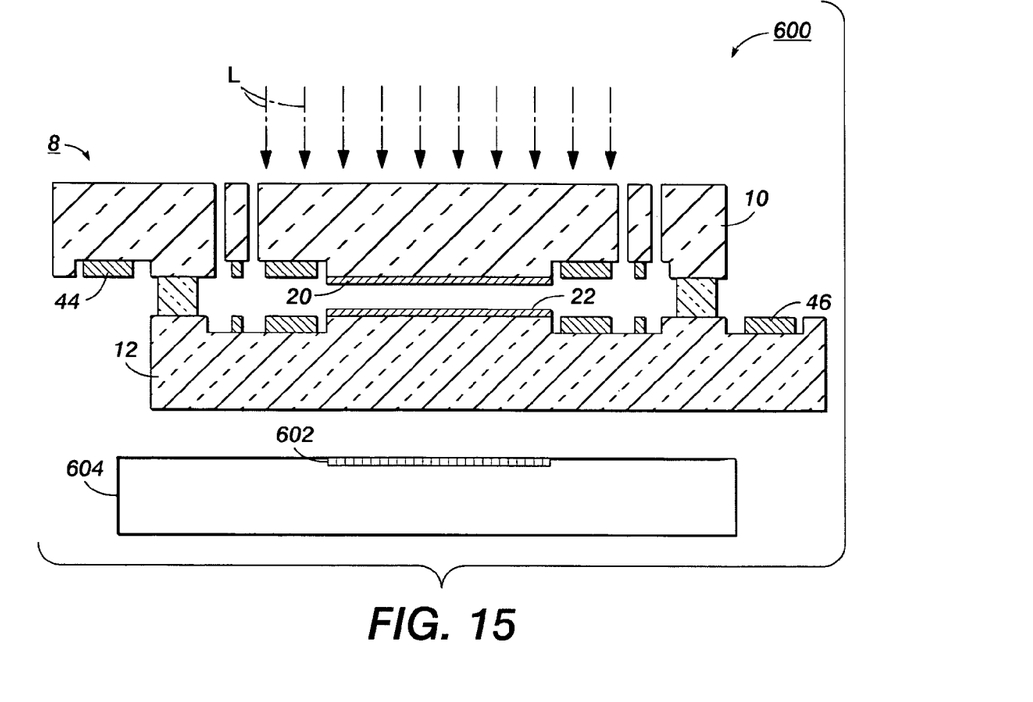
FIG. 15 diagrammatically shows a CCD-based imaging sensor employing the tunable Fabry-Perot device of FIG. 1.

With reference to FIG. 15, a CCD-based light detector or imaging sensor 600 employing the tunable Fabry-Perot device 8 of FIG. 1 is described. A charge-coupled device (CCD) array 602 disposed on a dedicated CCD array substrate 604 is arranged such that the CCD array 602 is aligned with the facing reflective surface regions 20, 22 of the Fabry-Perot device 8. (Note that in FIGS. 15 and 16, only a few components of the Fabry-Perot filter 8 are labeled). The dedicated CCD array substrate 604 includes printed circuitry and optionally other electronic components (not shown) for contacting and operating the CCD array 602. Light L incident on the facing reflective surface regions 20, 22 is selectively filtered by the tunable Fabry-Perot filter 8 such that only light at the tuned resonance wavelength $\lambda_{res}$ passes through the facing reflective surface regions 20, 22 to illuminate the CCD array 602. By selectively tuning the resonant wavelength $\lambda_{res}$ of the Fabry-Perot filter 8 by applying suitable biasing at the bonding pads 44, 46, the CCD imaging sensor 600 can be made to produce an image or spatial map of light at the tuned resonant wavelength. Although not shown in FIGS. 15 and 16, the CCD-based imaging sensor 600 optionally includes additional components such as imaging optics, neutral density filters, or so forth.

Figure 16:
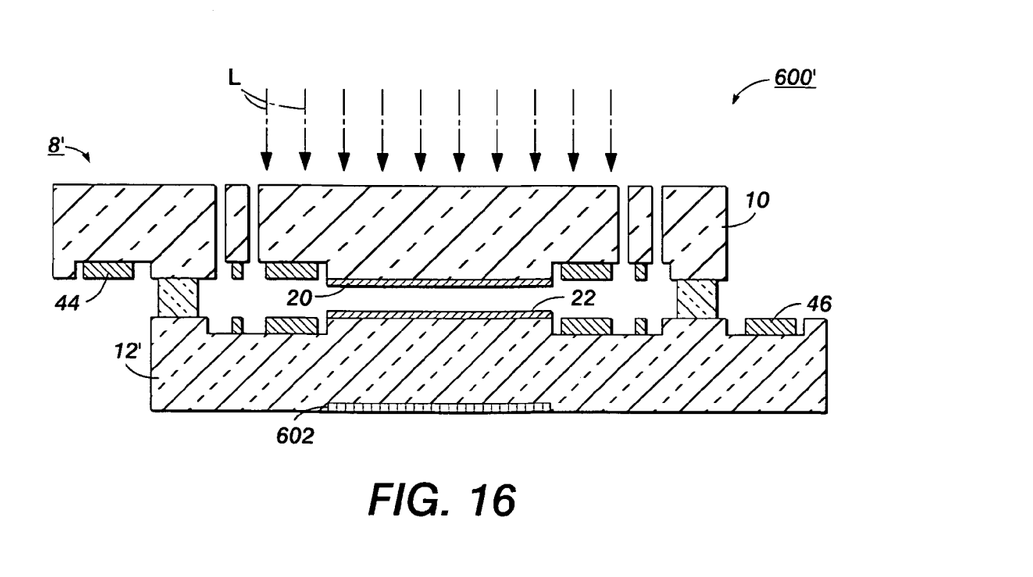
FIG. 16 diagrammatically shows another CCD-based imaging sensor employing the tunable Fabry-Perot device of FIG. 1, in which the CCD array is integrated with one of the transparent substrates of the Fabry-Perot device.

With reference to FIG. 16, another CCD-based light detector or imaging sensor 600' employing a modified tunable Fabry-Perot device 8' of FIG. 1 is described. The CCD-based imaging sensor 600' is substantially the same as the imaging sensor 600, except that the dedicated CCD array substrate 604 is omitted, and the CCD array 602 is instead integral with a modified substrate 12' of the tunable Fabry-Perot device 8', which is otherwise identical to the Fabry-Perot device 8 of FIGS. 1-3. Printed circuitry and any electronics (not shown) for operating the CCD array 602 are also integrated into the modified substrate 12'.

The light detectors of FIGS. 15 and 16 employ CCD arrays 602. Alternatively an array of photodetectors of another type, such as photodiodes, can be used. Moreover, if an integrated value, rather than an image, is desired, the CCD array 602 can be replaced by a single photodetector having an area comparable with the area of the facing reflective surface regions 20, 22.

It will be appreciated that several of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A tunable Fabry-Perot filter comprising:
a pair of substrates having parallel generally planar facing principal surfaces including:
spaced-apart facing reflective surface regions that are at least partially reflective at least over a selected wavelength range, the spaced-apart facing reflective surface regions defining an optical gap therebetween, at least one substrate of the pair of substrates being light-transmissive at least over the selected wavelength range to enable optical coupling with the optical gap through the at least one substrate, the facing reflective surface regions each having rigid support provided by supporting portions of the corresponding substrates that move with the facing reflective surface regions,
peripheral regions surrounding at least the facing reflective surface regions, the peripheral regions of the pair of substrates being stationary relative to one another, and
a deformable connection between the peripheral region and the reflective surface region of at least one substrate of the pair of substrates; and
electrodes disposed on the parallel generally planar principal surfaces of the substrates, the electrodes on the parallel generally planar facing principal surfaces defining an electrode gap therebetween, the deformable connection of the substrates enabling electrical biasing of the electrodes to simultaneously modify the optical and electrode gaps.

2. The tunable Fabry-Perot filter as set forth in claim 1, wherein the deformable connection comprises a spring arm defined by slots in the at least one substrate.

3. The tunable Fabry-Perot filter as set forth in claim 1, wherein the deformable connection comprises a spring arm defined by thinned regions of the at least one substrate.

4. The tunable Fabry-Perot filter as set forth in claim 1, wherein the deformable connection comprises a deformable material disposed over slots in the at least one substrate.

5. The tunable Fabry-Perot filter as set forth in claim 4, wherein the substrates are silica substrates, and the deformable material of the deformable connection is a polysilicon material.

6. The tunable Fabry-Perot filter as set forth in claim 4, wherein the substrates are selectively etchable over the deformable material.

7. A tunable Fabry-Perot filter comprising:
a pair of silica substrates having parallel generally planar facing principal surfaces including spaced-apart facing reflective surface regions that are at least partially reflective at least over a selected wavelength range, the spaced-apart facing reflective surface regions defining an optical gap therebetween, at least one silica substrate of the pair of silica substrates being light-transmissive at least over the selected wavelength range to enable optical coupling with the optical gap through the at least one silica substrate, wherein said facing reflective surface regions each have rigid support provided by supporting portions of the corresponding substrate that move with the facing reflective surface regions; and
electrodes disposed on the parallel generally planar facing principal surfaces of the silica substrates, the electrodes on the parallel generally planar facing principal surfaces defining an electrode gap therebetween such that electrical biasing of the electrodes simultaneously modifies the optical and electrode gaps.

8. The tunable Fabry-Perot filter comprising:
a pair of substrates having parallel generally planar facing principal surfaces including spaced-apart facing reflective surface regions that are at least partially reflective at least over a selected wavelength range, the spaced-apart facing reflective surface regions defining an optical gap therebetween, the facing reflective surface regions including distributed Bragg reflectors, at least one substrate of the pair of substrates being light-transmissive at least over the selected wavelength range to enable optical coupling with the optical gap through the at least one substrate, wherein said facing reflective surface regions each have rigid support provided by supporting portions of the corresponding substrate that move with the facing reflective surface regions; and
electrodes disposed on the parallel generally planar facing principal surfaces of the substrates, the electrodes on the parallel generally planar facing principal surfaces defining an electrode gap therebetween such that electrical biasing of the electrodes simultaneously modifies the optical and electrode gaps.

9. The tunable Fabry-Perot filter as set forth in claim 1, wherein the electrode gap is larger than the optical gap by an amount effective to suppress pull-in instability of the tunable Fabry-Perot filter.

10. The tunable Fabry-Perot filter as set forth in claim 1, wherein at least one of the electrodes is recessed into the respective generally planar principle surface to widen the electrode gap by an amount effective to prevent pull-in instability of the tunable Fabry-Perot filter.

11. The tunable Fabry-Perot filter as set forth in claim 1, wherein the at least one electrode is covered at least in part by a dielectric layer to prevent the electrodes from shorting together under bias.

12. The tunable Fabry-Perot filter as set forth in claim 1, wherein both of the substrates are light-transmissive at least over the selected wavelength range to enable light transmissive coupling with the optical gap through the pair of substrates.

13. The tunable Fabry-Perot filter as set forth in claim 8, further comprising:
a photodetector array optically coupled with the facing reflective surface regions of the Fabry-Perot filter, the photodetector array being integral with one of the pair of substrates.

14. The light detector as set forth in claim 13, wherein the photodetector array is a CCD array that is substantially coextensive with the area of the spaced-apart facing reflective surface regions.

15. The tunable Fabry-Perot filter as set forth in claim 8, wherein at least one of the electrodes is recessed into its respective generally planar principal surface such that the electrode gap is larger than the optical gap.

16. A method of fabricating a tunable Fabry-Perot filter, the method comprising:
for each of a pair of substrates, forming on a generally planar principal surface of the substrate a reflective surface region that is at least partially reflective at least over a selected wavelength range, the reflective surface region being surrounded by a peripheral region of the substrate;
for at least one substrate of the pair of substrates, removing portions of the substrate by lithographically controlled substantially isotropic wet chemical etching to define a deformable connection region between the reflective surface region and the peripheral region; and securing the peripheral regions of the pair of substrates in fixed relationship to one another with the reflective surface regions of the pair of substrates facing each other and spaced apart after the securing, wherein the substrates are made of silica, and the lithographically controlled wet chemical etching employs a hydrofluoric acid-based etchant that removes at least 200 microns of the substrate.

17. The method as set forth in claim 16, further comprising:
for each of the pair of substrates, forming an electrode on the generally planar principal surface of the substrate, the electrodes of the pair of substrates being spaced apart after the securing by a selected electrode gap.

18. The method as set forth in claim 17, further comprising:
selecting the electrode gap to be effective for preventing pull-in instability of the fabricated tunable Fabry-Perot filter.

19. The method as set forth in claim 16, further comprising:
forming electrodes on the generally planar principal surfaces of the substrate, the electrodes of the pair of substrates being spaced apart after the securing by an electrode gap that is greater than an optical gap between the spaced apart reflective surface regions.

20. The method as set forth in claim 16, further comprising:
prior to the removing of the portions of the substrate, disposing a deformable connection material on the portions to be removed, the deformable connection material being selected to act as an etch stop during the lithographically controlled wet chemical etching.

21. The method as set forth in claim 20, wherein the substrates are made of silica, the deformable connection material is polysilicon, and the lithographically controlled wet chemical etching employs a hydrofluoric acid-based etchant.

22. The method as set forth in claim 16, wherein each facing reflective surface region has rigid support provided by supporting portions of the corresponding substrate that moves with the facing reflective surface region.

* * * * *